E. E. MANSFIELD.
SELF ALIGNING PISTON AND CONNECTING ROD BEARING.
APPLICATION FILED AUG. 23, 1921.
1,434,904.
Patented Nov. 7, 1922.
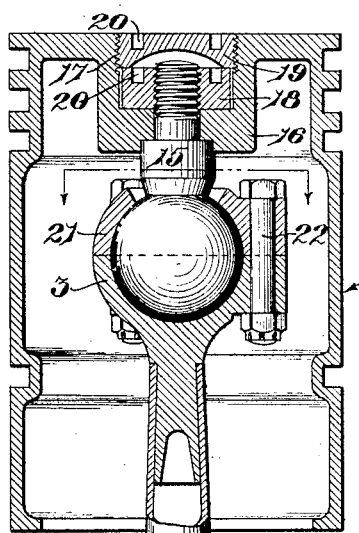
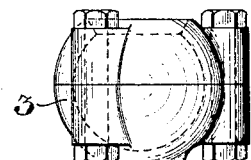
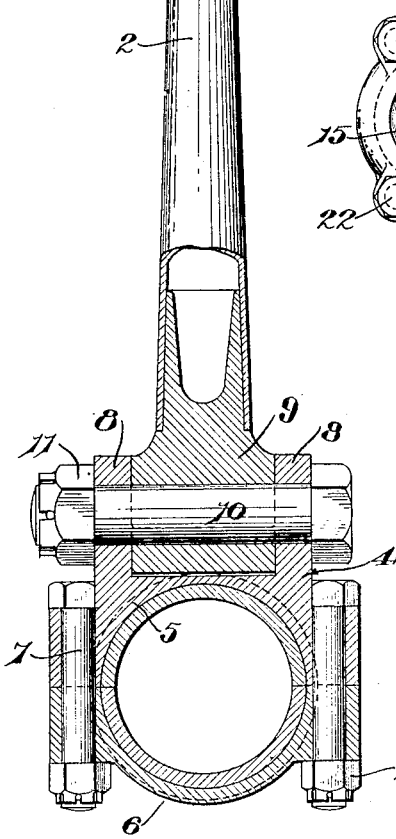
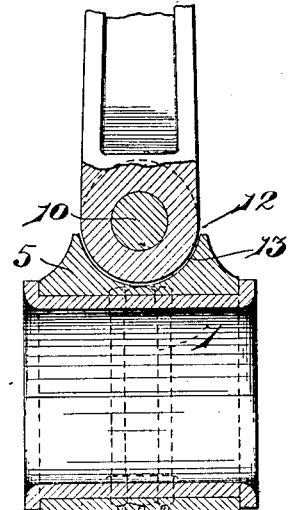
INVENTOR.
EDWIN E. MANSFIELD.
BY Chas. E. Townsend.
ATTORNEY.

Patented Nov. 7, 1922.

1,434,904

UNITED STATES PATENT OFFICE.

EDWIN E. MANSFIELD, OF KING CITY, CALIFORNIA.

SELF-ALIGNING PISTON AND CONNECTING ROD BEARING.

Application filed August 23, 1921. Serial No. 494,629.

*To all whom it may concern:*

Be it known that I, EDWIN E. MANSFIELD, a citizen of the United States, residing at King City, in the county of Monterey and State of California, have invented new and useful Improvements in Self-Aligning Piston and Connecting Rod Bearings, of which the following is a specification.

This invention relates to a self-aligning piston and connecting rod bearings, and while the invention is applicable to compressors, drills and other machines, it is in this instance particularly designed for internal combustion engines, such as used in automobiles, aeroplanes and the like, where it is desirable to reduce piston friction and side thrust to a minimum.

One of the objects of the present invention is to generally improve and simplify the pistons, the connecting rod and bearings of an internal combustion engine, and especially to provide a self-aligning piston and connecting rod bearings, whereby piston friction and side thrust may be reduced to a minimum.

Another object of the invention is to provide a piston which is so designed and formed that all internal surfaces may be machined to a uniform thickness, thereby insuring the least possible distortion from a true cylindrical form through expansion from heat.

Another object of the invention is to provide a self-aligning piston and rod so connected one with the other that the piston may be removed, that is with relation to the cylinder of any motor which is provided with a removable cylinder head, and without opening the crank case or in any way disturbing the bearings at either end of the connecting rod.

Another object of the invention is to provide a self-aligning piston rod and piston in which the construction is such that there are no pins, webs or other rigid ties formed between the piston walls, thereby avoiding distortion from a true cylindrical form by expansion caused by heat.

Another object of the invention is to provide a self-aligning piston rod and piston in which the rod is pivotally connected to the top crank bearing cap in such a manner as to allow the pivot to compensate, first when the crank pin is not disposed at directly right angles to the longitudinal axis of the cylinder; second, when the center line of the cylinders and bearing are not exactly correct, due to any cause whatever; third, when any distortion in the connecting rod or bending thereof is encountered and compensation therefore is automatically permitted.

Another object of the invention is to provide a self-aligning piston rod and piston in which the pivotal connection between the rod and the upper crank bearing cap makes it unnecessary to allow lateral play on either upper or lower end of rod, such as is usually provided to compensate for inaccuracies of machining or distortion.

Another object of the invention is to provide a self-aligning piston rod and piston in which all bearings are adjustable and adapted to be secured with standard S. A. E. bolts and nuts.

Further objects will hereinafter appear.

The invention consists of the parts and the construction, combination and arrangement of parts as hereinafter more fully described and claimed, having reference to the accompanying drawings, in which—

Fig. 1 is a sectional view of the piston, the connecting rod and the bearings.

Fig. 2 is a side elevation of the connecting rod taken at right angles to Fig. 1, said elevation being partially in section.

Fig. 3 is a plan view of the bearing on the upper end of the connecting rod.

Referring to the drawings in detail, and particularly to Fig. 1, A indicates in general the piston, 2 the connecting rod, 3 the upper connecting rod bearing, and 4 the lower bearing. The lower bearing consists of an upper and lower cap, such as shown at 5 and 6, respectively, which are secured with relation to each other by means of bolts 7. Formed on the upper bearing member 5 is a pair of bearing lugs 8. Disposed between the same is the lower end of the connecting rod as indicated at 9, and extending through the lugs and the lower end of the bearing is a bolt 10, about which the connecting rod is adapted to pivot. The bolt is secured in any suitable manner or as here shown by a nut 11. The lower end of the rod is rounded as at 12 and the surface formed between the lugs 8 is similarly concaved as shown at 13 to form a bearing surface against which the thrust of the rod may be exerted, to this extent aiding the bolt 10 in taking up or absorbing the thrust exerted.

The connecting rod proper may be constructed in any manner desired, for instance with a standard I-beam section, or it may be of a sectional tubular structure as shown in Fig. 1. The upper end of the rod is provided with a bearing 3 of hemispherical shape, and this bearing is adapted to receive a ball bearing, which in this instance is provided with a stud-like extension 15 extending through the piston head and secured as will hereinafter be described, that is a central downwardly extending boss 16 is formed on the inner side of the head. This boss is provided with a central chamber which is internally threaded as at 17. The lower end of the boss is drilled to receive the stud 15 and this is secured by means of a pair of nuts 18 and 19, the upper nut 19 forming the function of a nut or jamb nut. Both nuts are recessed, as at 20, for the reception of a spanner wrench and as such may be easily removed or replaced as conditions may demand.

The ball proper is secured with relation to the socket bearing 3, by means of an upper bearing section 21; this section being secured to the lower section by means of three bolts as indicated at 22, all of the bolts and nuts employed throughout being preferably standard S. A. E. fittings.

From the foregoing description it can be seen that piston friction and side thrust will be reduced to a minimum as a universal or floating connection is formed between the upper end of the rod and the piston; furthermore that the piston, the rod and the bearings are self-aligning, first, because of the universal or wall and socket connection employed, and secondly due to the pivotal connection formed by the bolt 10 between the lower end of the rod and the crank pin bearing. It can furthermore be seen that the general design of the piston eliminates the use of all bosses and webs, thereby forming a piston, the interior of which may be machined, and insuring a uniform thickness of metal throughout, and similarly a uniform expansion when the piston is subjected to heat.

By referring to Fig. 1 it can be seen that the piston may be removed, providing the head of the motor is removable, without opening the crank case or in any way disturbing the bearings at either end of the connection rod, this being possible as removal of the nuts 18 and 19 frees the piston with relation to the ball and socket bearing, thus permitting it to be removed through the top of the cylinder. The two particular connections formed between the respective ends of the rod, the piston and the crank pin bearing, are of further importance, first because it permits self-aligning of the piston and rod; second, it eliminates the necessity of forming lateral play at either end of the rod, thereby removing rattle or knock; furthermore, such connection insures equal pressure of the bearing on the crank pin throughout its entire length. It takes care of any bending or distortion of the rod and it eliminates all tendency to exert excess pressure on either the rear or the forward side of the cylinder wall.

The bearings employed throughout are of the split type and shims may therefore be employed. The bearings can therefore be readily taken up from time to time when worn as it will only necessitate the removal of one or more of the shims.

In the present instance no particular method of lubrication is illustrated, but it is obvious that any system desired may be employed. The ball and socket joint, however, can be readily lubricated by the ordinary splash system as a pocket or recess is formed around the upper end of the ball in surrounding relation to the stud 15. This pocket will obviously catch the oil and thus serve as a container, by which the ball and socket bearing will be amply lubricated.

While certain features of the present invention are more or less specifically illustrated, I wish it understood that various changes in form and proportion may be resorted to within the scope of the appended claims; similarly that the materials and finish of the several parts employed may be such as the experience and judgment of the manufacturer may dictate or varying uses may demand.

Having thus described my invention, what I claim and desire to secure by Letters Patent is—

1. The combination with a piston, its head and a connecting rod, of a ball member centrally disposed with relation to the head and secured thereto, and a split socket bearing on the upper end of the rod substantially enclosing the ball.

2. The combination with a piston, its head and a connecting rod, of a ball member centrally disposed with relation to the head and secured thereto; a split socket bearing on the upper end of the rod substantially enclosing the ball, and means on the upper side of the head for releasing the ball with relation to the head.

3. The combination with a piston, its head and a connecting rod, of a ball member centrally disposed with relation to the head and secured thereto, a split socket bearing on the upper end of the rod substantially enclosing the ball, a bolt forming an extension of the ball, and a nut applicable from the upper side of the head for securing the stud and the ball carried thereby.

4. In a piston connecting rod ball joint bearing, a piston, a head on said piston, a rod a ball centrally disposed and secured to the head, a hemispherically recessed seat formed in the upper end of the rod adapted to receive the lower half of the ball, and a ring shaped removable bearing secured to the hemispherical seat and enclosing substantially the upper half of the ball.

5. In a piston connecting rod ball joint and bearing, a piston, a head on said piston, a rod a central downwardly extending boss formed on the inner side of the head, said boss having a central chamber formed therein opening through the upper side of the head, a stud bolt having its threaded end extending into the central chamber, nuts for securing the bolt, a ball formed on the lower end of the bolt, and a split socket bearing on the rod substantially enclosing the ball.

6. In a piston connecting rod ball joint and bearing, a piston, a head on said piston, a rod a central downwardly extending boss formed on the inner side of the head, said boss having a central chamber formed therein opening through the upper side of the head, a stud bolt secured to the boss and having its threaded end extending into the central chamber, nuts for securing the bolt, a ball formed on the lower end of the bolt, a hemispherical shaped recessed seat formed in the upper end of the connecting rod adapted to receive the lower half of the ball, a ring shaped bearing enclosing substantially the upper half of the ball, and means for securing said ring shaped bearing to the upper end of the rod.

EDWIN E. MANSFIELD.